United States Patent
Kahn et al.

(10) Patent No.: US 9,693,382 B2
(45) Date of Patent: Jun. 27, 2017

(54) ACCESS INDEPENDENT SIGNALING AND CONTROL

(71) Applicant: Alcatel Lucent USA, Inc., Murray Hill, NJ (US)

(72) Inventors: Colin L. Kahn, Morris Plains, NJ (US); Harish Viswanathan, Murray Hill, NJ (US)

(73) Assignee: Alcatel-Lucent USA Inc., Murry Hill, NJ (US)

( * ) Notice: Subject to any disclaimer, the term of this patent is extended or adjusted under 35 U.S.C. 154(b) by 313 days.

(21) Appl. No.: 14/193,794

(22) Filed: Feb. 28, 2014

(65) Prior Publication Data
US 2015/0250009 A1    Sep. 3, 2015

(51) Int. Cl.
*H04W 76/02*    (2009.01)
*H04W 88/06*    (2009.01)

(52) U.S. Cl.
CPC .......... *H04W 76/026* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2008/0159232 A1* | 7/2008 | Thalanany | H04W 36/0016 370/332 |
| 2014/0259012 A1* | 9/2014 | Nandlall | H04W 4/003 718/1 |
| 2015/0043486 A1* | 2/2015 | Ozturk | H04W 76/026 370/329 |
| 2015/0126187 A1* | 5/2015 | Ponukumati | H04W 72/02 455/434 |

* cited by examiner

*Primary Examiner* — Hassan Phillips
*Assistant Examiner* — Saba Tsegaye
(74) *Attorney, Agent, or Firm* — Kramer & Amado, P.C.

(57) ABSTRACT

Various exemplary embodiments relate to a method, network node, and non-transitory machine-readable storage medium including one or more of the following: enabling communication via a first a second access network, wherein the first access network is a first type and the second access network is a second type; communicating with a first control application via at least one of the first access network and the second access network according to a signaling protocol that is used for the communication without regard for which of the first access network and the second access network are used for the communication, wherein the communication effects a change to service provided via at least one data bearer across at least one of the first access network and the second access network, and communicating via the at least one data bearer to exchange non-control application data with at least one other network device.

22 Claims, 3 Drawing Sheets

US 9,693,382 B2

ACCESS INDEPENDENT SIGNALING AND CONTROL

TECHNICAL FIELD

Various exemplary embodiments disclosed herein relate generally to network access control and, more particularly but not exclusively, to federation of control for different access network types such as, for example, WiFi, long term evolution (LTE), and 5G.

BACKGROUND

Many types of network access today, including many forms of Internet access, utilize an access network providing bearer paths between user devices and the network to be accessed. This arrangement allows the deployment of various control applications in the core of the access network to perform functions such as subscriber authentication, mobility management, quality of service assurance, and usage metering and charging. Various types of user devices are capable of accessing networks via multiple different types of access networks; for example, many modern smart phones typically may access the Internet via WiFi access networks and LTE access networks. These different access methods typically involve different radio access networks (RANs), core networks, and signaling protocols to establish appropriate data bearers across the access network.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments relate to a method performed by a user device, the method including: enabling communication via a first access network and a second access network, wherein the first access network is a first access network type and the second access network is a second network access type that is different from the first access network type; communicating with a first control application via at least one of the first access network and the second access network according to a signaling protocol that is used for the communication without regard for which of the first access network and the second access network are used for the communication, wherein the communication effects a change to service provided via at least one data bearer across at least one of the first access network and the second access network, and communicating via the at least one data bearer to exchange non-control application data with at least one other network device.

Various embodiments relate to a user device for network communication, the user device including: a memory; at least one network interface for communicating via a first access network and a second access network, wherein the first access network is a first access network type and the second access network is a second network access type that is different from the first access network type; and a processor in communication with the memory and the at least one network interface, the processor configured to: communicate with a first control application via at least one of the first access network and the second access network according to a signaling protocol that is used for the communication without regard for which of the first access network and the second access network are used for the communication, wherein the communication effects a change to service provided via at least one data bearer across at least one of the first access network and the second access network, and communicate via the at least one data bearer to exchange non-control application data with at least one other network device.

Various embodiments relate to a non-transitory machine-readable medium encoded with instructions for execution by a user device, the non-transitory machine-readable medium including: instructions for enabling communication via a first access network and a second access network, wherein the first access network is a first access network type and the second access network is a second network access type that is different from the first access network type; instructions for communicating with a first control application via at least one of the first access network and the second access network according to a signaling protocol that is used for the communication without regard for which of the first access network and the second access network are used for the communication, wherein the communication effects a change to service provided via at least one data bearer across at least one of the first access network and the second access network, and instructions for communicating via the at least one data bearer to exchange non-control application data with at least one other network device.

Various embodiments are described wherein the change to service provided via at least one data bearer includes establishing the at least one bearer.

Various embodiments are described wherein the memory stores session information created during a previous communication via the first access network with at least one of the first control application and a second control application, in communicating with the first control application, the processor is configured to transmit the session information to the first control application without regard for which of the first access network and the second access network are used for the communication.

Various embodiments are described wherein the first access network is a WiFi access network and the second access network is a long term evolution (LTE) access network.

Various embodiments are described wherein the control application includes a machine hosted in a cloud computing datacenter.

Various embodiments are described wherein the first control application includes at least one of a radio resource management control application, a mobility management control application, a security control application, a quality of service control application, a charging control application, a network control and monitoring application, and an optimization functions control application.

Various embodiments are described wherein the signaling protocol that is used for the communication without regard for which of the first access network and the second access network are used for the communication is a signaling protocol of the first access network type.

Various embodiments relate to a method performed by a control application device, the method including: enabling general communications with a user device via a first access network and a second access network, wherein the first access network is a first access network type and the second access network is a second network access type that is different from the first access network type; communicating with the user device via at least one of the first access network and the second access network according to a signaling protocol that is used for the communication without regard for which of the first access network and the second access network are used for the communication; and effecting, based on the communication, at least one change to a service provided via at least one data bearer across at least one of the first access network and the second access network, wherein the at least one data bearer carries non-control application data between the user device and at least one other network device.

Various embodiments relate to a control application device for controlling network communication of a user device, the control application device including: a memory; at least one network interface for communicating with the user device via a first access network and a second access network, wherein the first access network is a first access network type and the second access network is a second network access type that is different from the first access network type; and a processor in communication with the memory and the at least one network interface, the processor configured to: communicate with the user device via at least one of the first access network and the second access network according to a signaling protocol that is used for the communication without regard for which of the first access network and the second access network are used for the communication; and effecting, based on the communication, at least one change to a service provided via at least one data bearer across at least one of the first access network and the second access network, wherein the at least one data bearer carries non-control application data between the user device and at least one other network device.

Various embodiments relate to a non-transitory machine-readable storage medium encoded with instructions for execution by a control application device, the, the non-transitory machine-readable storage medium including: instructions for enabling general communications with a user device via a first access network and a second access network, wherein the first access network is a first access network type and the second access network is a second network access type that is different from the first access network type; instructions for communicating with the user device via at least one of the first access network and the second access network according to a signaling protocol that is used for the communication without regard for which of the first access network and the second access network are used for the communication; and instructions for effecting, based on the communication, at least one change to a service provided via at least one data bearer across at least one of the first access network and the second access network, wherein the at least one data bearer carries non-control application data between the user device and at least one other network device.

Various embodiments are described wherein, in effecting the at least one change, the processor effects establishment of the at least one data bearer.

Various embodiments are described wherein: the memory stores previous session information created during a previous communication via the first access network with the user device, in communicating with the user device, the processor is configured to receive session information from the user device, and the processor is further configured to identify a session of the user device by comparing the received session information to the previous session information without regard for which of the first access network and the second access network are used for the communication.

Various embodiments are described wherein in effecting the at least one change, the processor transmits at least one command to a different network device to effect the at least one change.

Various embodiments are described wherein the different network device is a network controller device that supports at least one software defined network protocol.

Various embodiments are described wherein the memory, at least one interface, and processor are hardware resources provided by a cloud computing system.

Various embodiments are described wherein the signaling protocol that is used for the communication without regard for which of the first access network and the second access network are used for the communication is a signaling protocol of the first access network type.

Various embodiments are described wherein communicating with the user device comprises communicating with the user device via a signaling gateway that translates communications between the signaling protocol and a legacy protocol supported by the user device.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to an IPSec/ESP connection, it will be understood that the techniques and arrangements described herein may be implemented to facilitate switchovers in other types of connections that implement similar anti-replay or sequence numbering features.

Current mobile access methods often involve a tight coupling between radio access network (RAN) and core network signaling protocols and the access media used to deliver content. In many cases, this arrangement has developed because different access methods have been independently standardized by different bodies (LTE/UMTS by 3GPP, WiFi by IEEE, etc.) with each specifying the procedures utilized to gain access to a bearer path for transmitting or receiving data over the technology. As a result, today a device that uses a RAN and core network signaling protocol from one technology does not transfer to another available technology and, hence, similar procedures must be executed multiple times in order to make use of the available access options.

Figure 1:
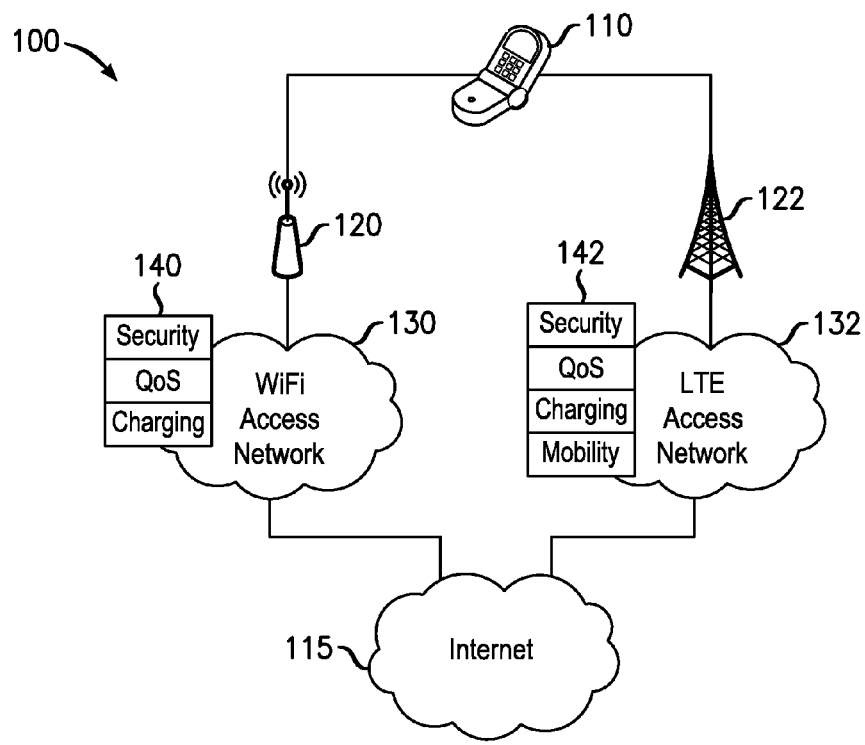
FIG. 1 illustrates an exemplary network providing multiple access methods and non-federated control.

FIG. 1 illustrates an exemplary network 100 providing multiple access methods and non-federated control. The network 100 includes a user device 110 in communication with the Internet 115. The user device 100 may be virtually any end-user device supporting network communication such as, for example, a smart phone, tablet, other mobile device, laptop computer, desktop computer, set top box, television, or video game console. It will be understood that, while the network 100 and other examples described herein illustrate access to the Internet 115 specifically, the methods and devices described herein may be applied for providing access to other types of networks.

The user device 110, as shown, is provided with appropriate hardware and configured to communicate via at least two different types of access networks. In the example of FIG. 1, the user device is capable of connecting both to a WiFi access point 120 and a cellular base station 122, however various additional or alternative wireless and wireline access point types will be apparent. The WiFi access point provides access to a WiFi access network 130, while the cellular base station 122 provides access to a long term evolution (LTE) access network 132. Both of these networks 130, 132 provide access to the Internet 115. It will be apparent that various additional intermediate devices such as routers and switches (not shown) may be present between the network devices illustrated in FIG. 1. Further, in various embodiments, the user device 110 may connect and communicate simultaneously over both access networks 130, 132, while in other embodiments the user device 110 may connect and communicate over one access network 130, 132 at a time.

The user device 110 may communicate with the access points 120, 122 and via the access networks 130, 132 according to the appropriate protocols. For example, the user device 110 may communicate with the WiFi access point 120 and via the WiFi access network 130 according to WiFi protocols set forth by the IEEE, and may communicate with the cellular base station 122 and via the LTE access network 132 according to LTE protocols set forth by the 3GPP. As will be understood, the various communication channels established from the user device 110, across an access network 130, 132 are referred to as "bearers."

The bearers established for the user device are subject to various forms of control and, as such, the access networks 130, 132 implement control applications 140, 142 which may be specific to the relevant standards set forth by the IEEE, 3GPP, or other relevant bodies. For example, the WiFi control applications 140 may provide security functions such as authorization and authentication, quality of service (QoS) functions such as establishing maximum and guaranteed bitrates for bearers across the WiFi access network 130, and charging functions for charging a subscriber for usage of the WiFi access network 130. Such functions may be performed according to relevant IEEE WiFi standards. Similarly, the LTE control applications 132 may perform security functions, QoS functions, charging functions, and mobility functions for maintaining the user device's 110 connection when the user device 110 moves between cellular base stations 122. These functions, though in some cases similar to those performed by the WiFi control applications, may be instead performed according to the relevant 3GPP LTE standards. Various additional or alternative control applications will be apparent. Further, it will be understood that the various control applications 140, 142 may be implemented by specific devices within the relevant access networks 140, 142. For example, the LTE QoS and charging applications 142 may be implemented by a policy and charging rules function (PCRF) device and a policy and charging enforcement function (PCEF) device, as described by the relevant 3GPP standards.

It will be understood that various components of the network 100 may be duplicated. For example, the network 100 may support hundreds of user devices (not shown), provide multiple access points 120 and base stations 122, include additional types access networks (not shown), or enable access to other networks in addition to or in alternative to the Internet 115. Various other modifications will be apparent.

Figure 2:
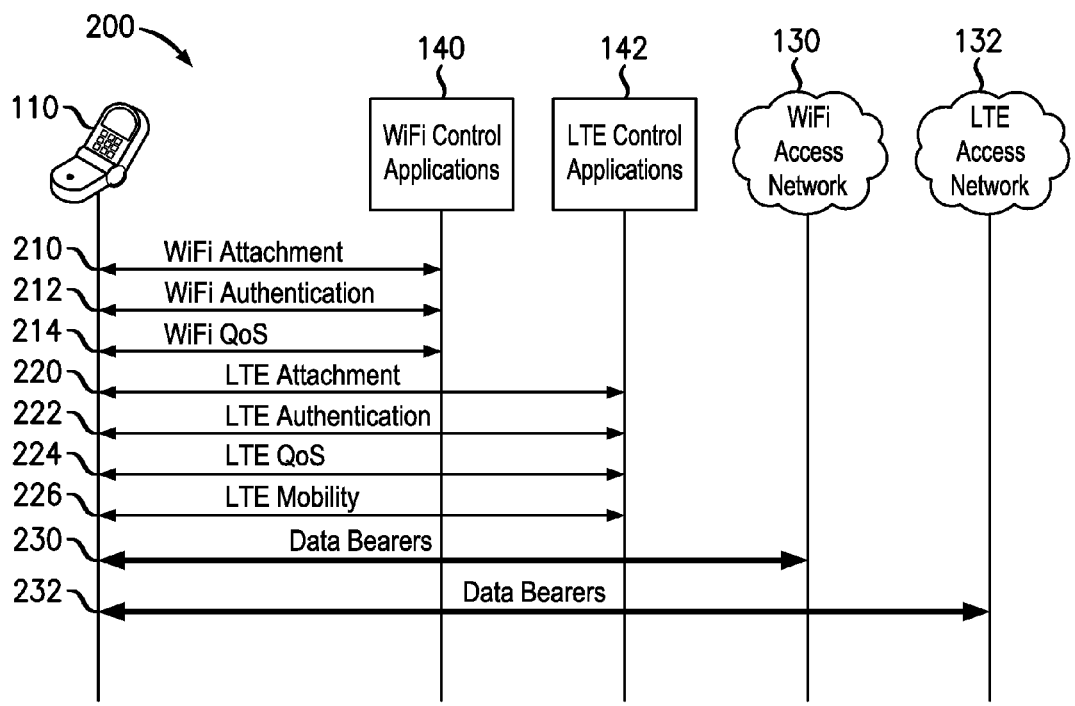
FIG. 2 illustrates an exemplary message exchange for establishing data communication in a multiple access method network employing non-federated control.

FIG. 2 illustrates an exemplary message exchange 200 for establishing data communication in a multiple access method network employing non-federated control. The message exchange 200 occurs between various devices of the exemplary network 100 to establish data bearers. It will be understood, however, that similar message exchanges with the same or other control applications may be used to effect changes to existing bearers.

As shown, to establish a WiFi data bearer, the user device 110 communicates with the WiFi control applications 140. For example, the user device 110 may communicate to attach 210, authenticate 212, and request/set QoS values 214 for the new bearer. These communications 210, 212, 214 are performed according to WiFi-specific signaling protocols. Similarly, the user device 110 may communicate with the LTE control applications 142 to attach 220, authenticate 222, request/set QoS values 224 for the new bearer, and establish mobility procedures 226 according to LTE-specific protocols. Thereafter, data bearers 230, 232 may be established with the WiFi access network 130 and LTE access network 132, respectively. Thus, even though the WiFi signaling 210, 212, 214 may be similar to the LTE signaling 220, 222, 224, 226, the effort of the user device 110 and control applications 140, 142 is duplicated because of minor differences in protocol and the separate control devices implementing control functionality in the different access network types.

Figure 3:
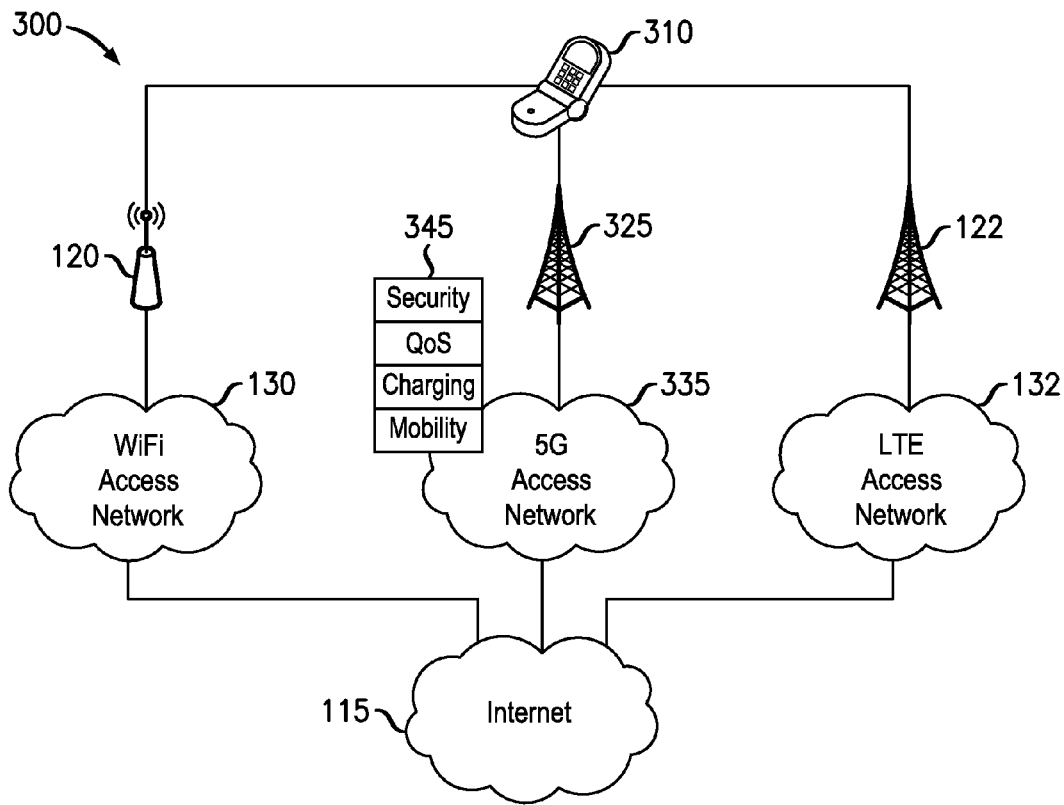
FIG. 3 illustrates an exemplary network providing multiple access methods and federated control.

FIG. 3 illustrates an exemplary network 300 providing multiple access methods and federated control. The network 300, herein referred to as a "5G network," may be similar to the exemplary network 100 of FIG. 1, including many of the same components. As shown, the network includes an additional 5G base station 325 providing access to a 5G access network 335. As will be understood, "5G" refers to the as-yet undefined fifth generation mobile access expected to be defined by the 3GPP.

The 5G access network also includes multiple control applications 345 similar to those 140, 142 described with respect to FIG. 1. It will be noted, however, that in the example of FIG. 5, the WiFi access network 130 and LTE access network 132 no longer implement their respective control applications 140, 142. Instead, the 5G control applications 345 perform the associated control functions for the user device 310 regardless of which access network(s) 130, 132, 335 carry the bearer to be established or modified. Thus, control signaling for the disparate networks 130, 132, 335 is federated into a single central set of protocols. In various alternative embodiments, one or more legacy control applications 140, 142 may be implemented along with the capability of being controlled by 5G control applications 345.

In various embodiments, the 5G control applications 345 may implement translation functions or may be otherwise configured to communicate according to the WiFi or LTE protocols, such that that federating control applications are capable of issuing control instructions to the various devices of the access networks 130, 132 without requiring modification of these networks 130, 132 to understand 5G specific communications. In other words, in such embodiments, the 5G control applications may provide a layer of abstraction to the user device 310 such that, to the user device, all signaling appears according to 5G protocols, while between the 5G control applications and relevant access network devices supporting the bearers communications may occur according to appropriate 5G, LTE, WiFi, or other standards. In various alternative embodiments, some or all of these access network devices supporting the bearers may be modified to properly interpret 5G specific signaling.

It will be understood that the exemplary network 300 is only one example of a network that may implement federation of control. Any alternative to 5G may be used as a federating protocol. For example, other existing or future protocols may implement access-independent control applications and signaling protocols. As another example, a third federating protocol may not be provided and, instead, control may be federated to one of the access networks already existing in the network 100 of FIG. 1. For example, control for both the WiFi and LTE access networks 130, 132 may be performed by the LTE control applications 142. The LTE control applications 142 may be configured to issue appropriate WiFi-specific instructions to the components of the WiFi access network 130 or the components of the WiFi access network 130 may be configured to interpret and fulfill LTE-specific instructions received from the LTE control applications 142. Alternatively, a signaling gateway may convert LTE signaling protocol instructions to equivalent WiFi signaling protocol instructions. Another possible modification is that the 5G access network 335 may be accessible via the same base station 122 (or same types of base stations) that provides access to the LTE access network 132. Various additional modifications will be apparent.

Figure 4:
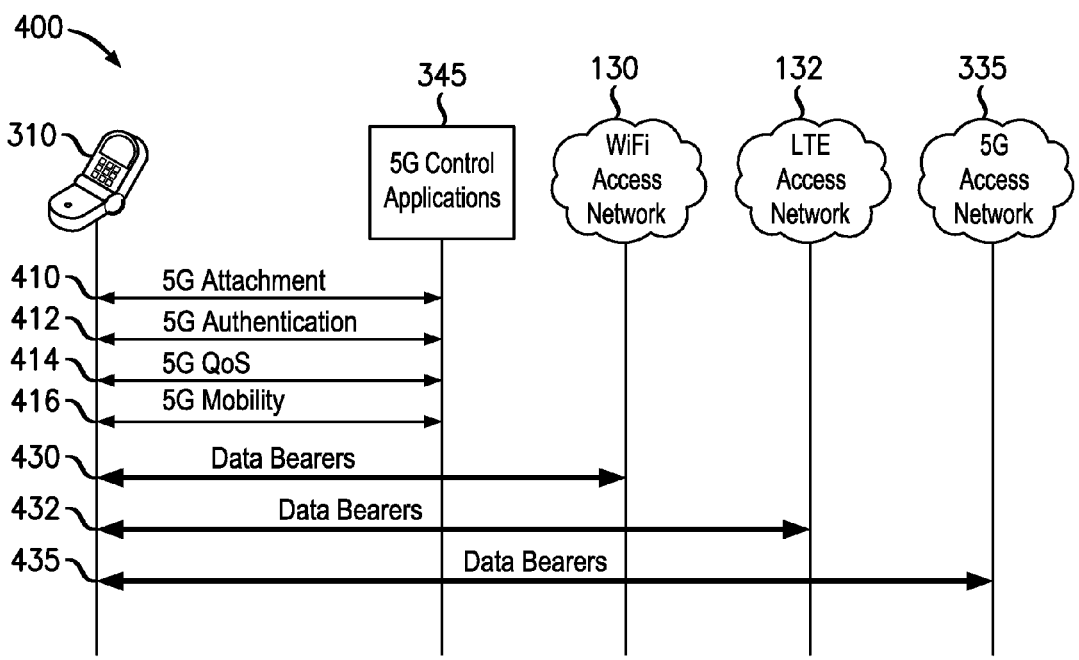
FIG. 4 illustrates an exemplary message exchange for establishing data communication in a multiple access method network employing federated control

FIG. 4 illustrates an exemplary message exchange 400 for establishing data communication in a multiple access method network employing federated control. The message exchange 400 occurs between various devices of the exemplary network 300 to establish data bearers. It will be understood, however, that similar message exchanges with the same or other control applications may be used to effect changes to existing bearers. Such changes may include movement of data bearers between access network, altering QoS parameters, or altering charging and metering parameters.

As shown, to establish the desired bearers, the user device 310 communicates with the 5G control applications 345. Because control signaling is federated to the 5G control applications in this example, the user device 310 need not select the destination based on the access network type. In other words, regardless of whether the user device 310 establishes access via the WiFi access network 130, LTE access network 132, or 5G access network 135, the user device 310 uses the 5G signaling protocols to access the 5G control applications 345. It will be understood that access via an access network simply refers to an arrangement wherein an access network forms at least a portion of the communication path between the devices in communication. For example, where the user device 310 is in communication with the 5G control applications 345 via the WiFi access network 130, the communication path may be formed by the WiFi access point 120, WiFi access network 130, 5G access network 335 and one or more intermediate components (not shown) situated between these devices.

To establish data bearers, the user device 310 communicates with the 5G control applications 345 to attach 220, authenticate 222, request/set QoS values 224 for the new bearer, and establish mobility procedures 226 according to 5G-specific protocols. Thereafter, the 5G control applications determine how to establish or modify the bearers based on appropriate context information other than the type of access network the user device 310 is currently using. For example, in fulfilling the QoS request 414, the 5G QoS control application 345 may consider the QoS values requested, the typical demands for the non-control application being established (as may be reported in the request or otherwise), current network congestion, and allowed QoS parameters stored in the subscriber profile for the user of the user equipment 310 to make a decision on what QoS should be enforced on the bearer; it will be noted that this decision may be performed the same regardless of whether the communication 414 is performed via the WiFi access network 130, the LTE access network 132, or the 5G access network. In various embodiments, the 5G QoS control application 345, in considering QoS, may assign a different bearer (e.g., WiFi, LTE, or 5G) from a bearer on which access occurred without re-executing the control procedures.

This federated control may also enable migration of the user equipment from one access network type to another. For example, user equipment 310 may initially attach via the WiFi access network 130 and communicate with the 5G control applications 345 to establish a session. As part of this session establishment, the user device 310 may store session information, such as a session ID or state information, for use in further communications with the 5G control applications with regard to the session. Alternatively, the session information may simply be a subscriber identifier or other non-session specific information that is correlated by one or more of the 5G control applications to any sessions that have been established. Continuing with the example, upon moving and attaching to the LTE access network 132, the user device 310 may use the same previously established session information to identify itself and the established sessions to the 5G control applications 345, even though the communications 410, 412, 414, 416 may now be sent via a different type of network (in this example, the LTE access network 132 instead of the WiFi access network 130).

After completion of the access-independent signaling 410, 412, 414, 416, the 5G control applications may communicate with one or more other devices to effect establishment or other changes to the appropriate bearers 430, 432, 435 across the various access networks 130, 132, 335, respectively. For example, where an LTE data bearer 432 is being established, the 5G control applications 345 may generate and transmit an LTE policy and charging control (PCC) rule to a packet data network gateway (PGW) implementing a PCEF in the LTE access network 132.

Figure 5:
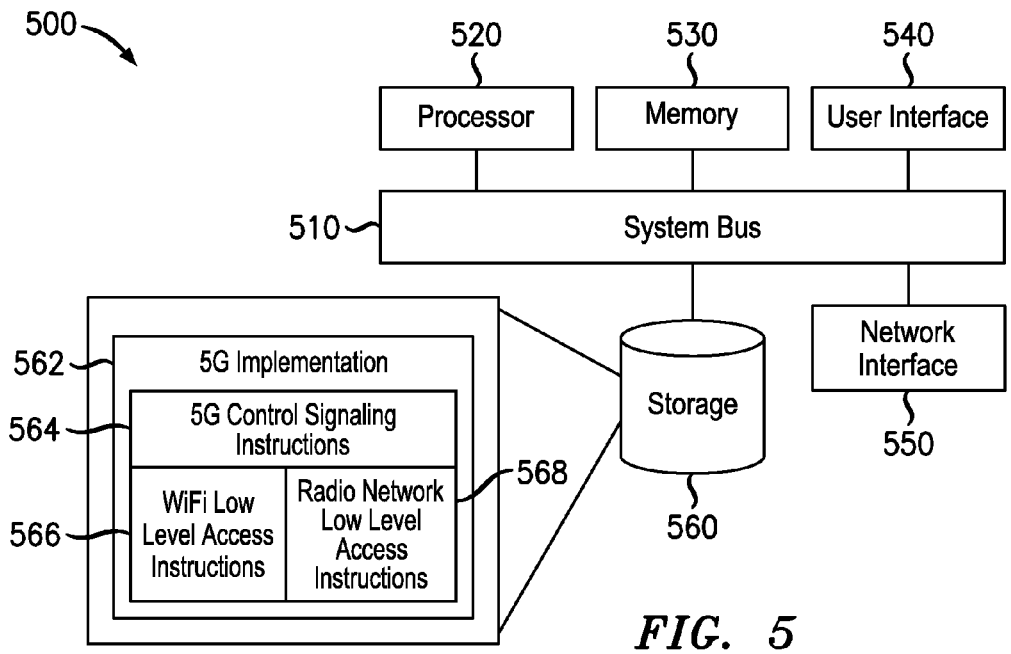
FIG. 5 illustrates an exemplary hardware diagram for implementing a user device or control application device for providing federated control.

FIG. 5 illustrates an exemplary hardware diagram 500 for implementing a user device or control application device for providing federated control. The exemplary hardware 500 may correspond to the user device 310 or one or more of the control applications 345 of the exemplary network 300 of FIG. 3. It will be understood that FIG. 5 constitutes, in some respects, an abstraction and that the actual organization of the components of the hardware 500 may be more complex than illustrated.

The processor 520 may be any hardware device capable of executing instructions stored in memory 530 or storage 560. As such, the processor may include a microprocessor, field programmable gate array (FPGA), application-specific integrated circuit (ASIC), or other similar devices.

The memory 530 may include various memories such as, for example L1, L2, or L3 cache or system memory. As such, the memory 530 may include static random access memory (SRAM), dynamic RAM (DRAM), flash memory, read only memory (ROM), or other similar memory devices.

The user interface 540 may include one or more devices for communicating with a human user. For example, the user interface 540 may include a display, speaker, touchscreen, mouse, or keyboard.

The network interface 550 may include one or more devices for enabling communication with other hardware devices. For example, the network interface 550 may include one or more antennae for wireless communication or one or more ports for wired communication. Various alternative or additional hardware or configurations for the network interface 550 will be apparent.

The storage 560 may include one or more machine-readable storage media such as read-only memory (ROM), random-access memory (RAM), magnetic disk storage media, optical storage media, flash-memory devices, or similar storage media. In various embodiments, the storage 560 may store instructions for execution by the processor 520 or data upon which the processor 520 may operate. For example, the storage 560 includes a 5G implementation 562, including those features of 5G appropriate for implementation in a user device. It will be understood that the portions of 5G (or any other federating protocol) implemented as part of the 5G implementation 562 will depend on whether the hardware device 500 implements an end user device or a control application.

As part of the 5G implementation 562, the storage 560 may store appropriate 5G control signaling instructions 564. As described above, the 5G control signaling instructions 564 may be used for signaling via different types of access networks such as WiFi and LTE networks. As such, the control signaling instructions 564 may be supported by WiFi low level access instructions 566 and LTE low level access instructions 568. As will be understood, "low level access" may refer to the aspects of communication that occur at lower layers of the OSI model such as the physical, data link, network, or transport layers. Thus, while 5G (or another protocol) may federate control signaling, lower layer protocols may remain unfederated and therefore be implemented separately.

It will be apparent that various information described as stored in the storage 560 may be additionally or alternatively stored in the memory 530. In this respect, the memory 530 may also be considered to constitute a "storage device." Various other arrangements will be apparent. Further, the memory 530 and storage 560 may both be considered to be "non-transitory machine-readable media." As used herein, the term "non-transitory" will be understood to exclude transitory signals but to include all forms of storage, including both volatile and non-volatile memories.

While the hardware 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. In some embodiments, such as those wherein the hardware 500 is implemented in a cloud computing architecture, components may be physically distributed among different devices. For example, the processor 520 may include a first microprocessor in a first data center and a second microprocessor in a second data center. Various other arrangements will be apparent.

Figure 6:
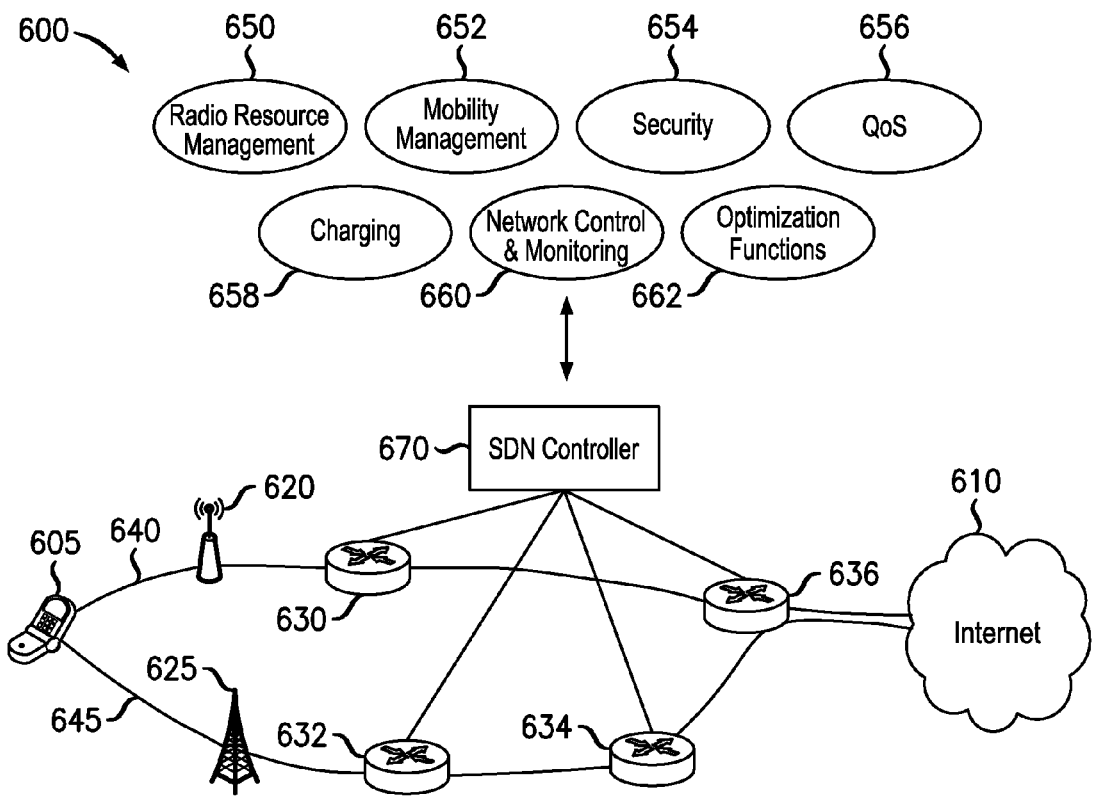
FIG. 6 illustrates an exemplary software defined network for providing federated control of Internet access.

In various alternative embodiments, a software defined network (SDN) may decouple control applications from the access networks. FIG. 6 illustrates an exemplary SDN 600 for providing federated control of Internet access. As shown, a user device 605 may communicate with the Internet 610 (or any other network) via various network components such as a WiFi access point 620, cellular base station 625, and one or more network routers 630, 632, 634, 636. Some or all of the network routers 630, 632, 634, 636 may be generic service routers or protocol-specific (e.g., LTE-specific or WiFi specific) routers. As shown, the user device 605 may have two established data bearers 640, 645. A first data bearer 640 may transit a WiFi access network including the WiFi access point 620 and two routers 630, 636. A second data bearer 645 may transit an LTE access network including the cellular base station 625 and three routers 632, 634, 636. It will be understood that the access network may constitute an abstraction in some respects and that additional devices or configurations may be present. For example, a baseband unit (BBU) (not shown) may perform baseband signal processing between the base station 625 and the router 632. As another example, a tunnel may be established between routers 632, 634 (and potentially across one or more intermediate routers therebetween, not shown) for high mobility flows. Various other devices and configurations will be apparent.

The control applications 650-662 may be separated from the network hardware 620-636 that carries traffic to the Internet 610 (but may be accessible via that network hardware 620-636). For example, the control applications 650-662 may be implemented within a cloud computing architecture as one or more virtual machines in one or more cloud data centers. As shown, a variety of control applications may be provided including, but not limited to, a radio resource management control application 650 (e.g., RAN-specific management of the access points and other devices proximate to the access points), a mobility management control application 652, a security control application 654, a quality of service control application 656, a charging control application 658, a network control and monitoring application 660 (e.g., for using network state analytics and other information beyond desired QoS for allocation of resources), and an optimization functions control application 662 (e.g., for effecting transcoding of high quality video down to low quality video to reduce network load, and other application-specific optimizations). The various methods that may be performed by these control applications 650-662 as well as additional or alternative control applications for inclusion in the network 600 will be apparent. As explained above, each of the control applications 650-662 implements 5G (or another federating protocol) to control network access for the user device 605 regardless of what lower layer technologies the user device 605 uses to access the network hardware 620-636. For example, one or more control application 650-662 may maintain session information that is utilized in communications with the user device 605 regardless of whether the user device is attached to the WiFi access point 620 or the cellular base station 625. Various other modifications in view of the foregoing will be apparent.

As will be understood in the context of software defined networking, the network 600 also includes a network controller 670 (such as an SDN controller that may support one or more SDN protocols and wireless access specific protocols) for receiving abstracted commands from the control applications 650-662 and transmitting corresponding commands to the network hardware 630-636 for fulfilling the abstracted commands. The SDN controller 670 may be a standalone device or may be implemented in a cloud computing system as a virtual machine. As such, the SDN controller may be capable of issuing WiFi-, LTE-, and 5G-specific commands to the various hardware devices 630-636 to effect changes to the bearers 640, 645 as appropriate to the changes requested by the 605 via 5G signaling and approved or otherwise requested by the appropriate control applications 650-662. The network controller 670 may include a control application API facing the control applications 650-660, an SDN controller facing the network equipment 620-636, network configuration policies and templates, and information regarding network topology and resource utilization. In various embodiments, the network controller 670 communicates with a user device via a signaling gateway. For example, the network controller 670 may communicate with a signaling gateway (SGW) which may, in turn, translate between legacy protocols and the selected common control protocol (e.g., 5G). Such an arrangement may be beneficial where, for example, the user device does not support the common control protocol or otherwise does not support access-independent signaling control.

In view of the foregoing, various embodiments enable access-independent signaling and control. For example, by providing a single signaling protocol and access-independent control applications utilizing the signaling protocol, overhead associated with establishing communication via multiple types of access network may be reduced. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A user device for network communication, the user device comprising:
   a memory;
   at least one network interface configured to communicate via a first access network and a second access network, wherein the first access network is a first access network type and the second access network is a second network access type that is different from the first access network type; and
   a processor in communication with the memory and the at least one network interface, wherein the processor is configured to communicate with a first control application via both the first access network and the second access network according to a single central set of protocols that federates control signaling for the first access network and the second access network, and the communication effects a change to service provided via at least one data bearer across at least one of the first access network and the second access network, and communicate via the at least one data bearer to exchange non-control application data with at least one other network device.

2. The user device of claim 1, wherein the change to service provided via at least one data bearer comprises establishing the at least one data bearer.

3. The user device of claim 1, wherein the memory is configured to store session information created during a previous communication via the first access network with at least one of the first control application and a second control application, and, in communicating with the first control application, the processor is configured to transmit the session information to the first control application without regard for which of the first access network and the second access network are used for the communication.

4. The user device of claim 3, wherein the signaling protocol that is used for the communication without regard for which of the first access network and the second access network are used for the communication is a signaling protocol of the first access network type.

5. The user device of claim 1, wherein the first access network is a WiFi access network and the second access network is a long term evolution (LTE) access network.

6. The user device of claim 1, wherein the control application comprises a machine hosted in a cloud computing datacenter.

7. The user device of claim 1, wherein the first control application comprises at least one of a radio resource management control application, a mobility management control application, a security control application, a quality of service control application, a charging control application, a network control and monitoring application, and an optimization functions control application.

8. A control application device for controlling network communication of a user device, the control application device comprising:

a memory;
at least one network interface configured to communicate with the user device via a first access network and a second access network, wherein the first access network is a first access network type and the second access network is a second network access type that is different from the first access network type; and
a processor in communication with the memory and the at least one network interface, wherein the processor is configured to communicate with the user device via both the first access network and the second access network according to a single central set of protocols that federates control signaling for the first access network and the second access network, and effecting, based on the communication, at least one change to a service provided via at least one data bearer across at least one of the first access network and the second access network, wherein the at least one data bearer carries non-control application data between the user device and at least one other network device.

9. The control application device of claim 8, wherein, in effecting the at least one change, the processor effects establishment of the at least one data bearer.

10. The control application device of claim 8, wherein the memory is configured to store previous session information created during a previous communication via the first access network with the user device, and, in communicating with the user device, the processor is configured to receive session information from the user device and identify a session of the user device by comparing the received session information to the previous session information without regard for which of the first access network and the second access network are used for the communication.

11. The control application device of claim 10, wherein the signaling protocol that is used for the communication without regard for which of the first access network and the second access network are used for the communication is a signaling protocol of the first access network type.

12. The control application device of claim 8, wherein in effecting the at least one change, the processor is configured to transmit at least one command to a different network device to effect the at least one change.

13. The control application device of claim 12, wherein the different network device is a network controller device that supports at least one software defined network protocol.

14. The control application device of claim 8, wherein the memory, the at least one network interface, and the processor are hardware resources provided by a cloud computing system.

15. The control application device of claim 8, wherein in communicating with the user device, the processor is configured to communicate with the user device via a signaling gateway that translates communications between the signaling protocol and a legacy protocol supported by the user device.

16. A non-transitory machine-readable storage medium encoded with instructions for execution by a control application device, the non-transitory machine-readable storage medium comprising:
instructions for enabling general communications with a user device via a first access network and a second access network, wherein the first access network is a first access network type and the second access network is a second network access type that is different from the first access network type;
instructions for communicating with the user device via both the first access network and the second access network according to a single central set of protocols that federates control signaling for the first access network and the second access network; and
instructions for effecting, based on the communication, at least one change to a service provided via at least one data bearer across at least one of the first access network and the second access network, wherein the at least one data bearer carries non-control application data between the user device and at least one other network device.

17. The non-transitory machine-readable storage medium of claim 16, wherein the instructions for effecting the at least one change comprise:
instructions for effecting establishment of the at least one data bearer.

18. The non-transitory machine-readable storage medium of claim 16, wherein the memory stores previous session information created during a previous communication via the first access network with the user device, and the instructions for communicating with the user device comprise:
instructions for identifying session information received from the user device, and the non-transitory machine-readable storage medium further comprises:
instructions for identifying a session of the user device by comparing the received session information to the previous session information without regard for which of the first access network and the second access network are used for the communication.

19. The non-transitory machine-readable storage medium ice of claim 18, wherein the signaling protocol that is used for the communication without regard for which of the first access network and the second access network are used for the communication is a signaling protocol of the first access network type.

20. The non-transitory machine-readable storage medium of claim 16, wherein the instructions for effecting the at least one change comprise:
instructions for transmitting at least one command to a different network device to effect the at least one change.

21. The non-transitory machine-readable storage medium of claim 20, wherein the different network device is a network controller device that supports at least one software defined network protocol.

22. The control application device of claim 16, wherein the instructions for communicating with the user device comprise:
instructions for communicating with the user device via a signaling gateway that translates communications between the signaling protocol and a legacy protocol supported by the user device.

* * * * *